F. ENGEL.
STORAGE BATTERY CELL.
APPLICATION FILED SEPT. 12, 1917.

1,398,847.

Patented Nov. 29, 1921.

WITNESS:

INVENTOR.
Frank Engel
BY
ATTORNEY.

UNITED STATES PATENT OFFICE.

FRANK ENGEL, OF NIAGARA FALLS, NEW YORK, ASSIGNOR TO U. S. LIGHT & HEAT CORPORATION, OF NIAGARA FALLS, NEW YORK, A CORPORATION OF NEW YORK.

STORAGE-BATTERY CELL.

1,398,847. Specification of Letters Patent. Patented Nov. 29, 1921.

Application filed September 12, 1917. Serial No. 190,879.

*To all whom it may concern:*

Be it known that I, FRANK ENGEL, a citizen of the United States, residing at Niagara Falls, in the county of Niagara and State of New York, have invented new and useful Improvements in Storage-Battery Cells, of which the following is a specification.

The present invention relates to storage battery cells.

In battery cells of large size, as for instance those used in marine service, it is necessary to provide special means for ventilating the cells to remove the gases which are formed by the action of the electrolyte.

The present invention has for one of its objects the provision of means whereby the cell may be ventilated efficiently and whereby a minimum of reduction in the amount of electrolyte will occur through evaporation.

A further object is to provide a novel construction in which the gases may be conducted through paths of minimum resistance to a point in the cell whence they may be exhausted from said cell.

A further object is to provide a novel construction by virtue of which exhaust means may be conveniently attached from any angle.

Further objects will be apparent as the description proceeds.

In the drawings—

Figure 1:
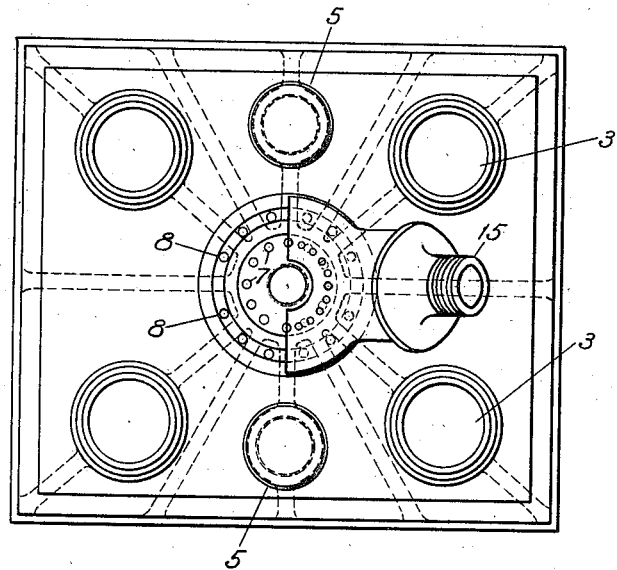
Figure 1 represents a plan view of a battery cell embodying the present invention.
Figure 3:
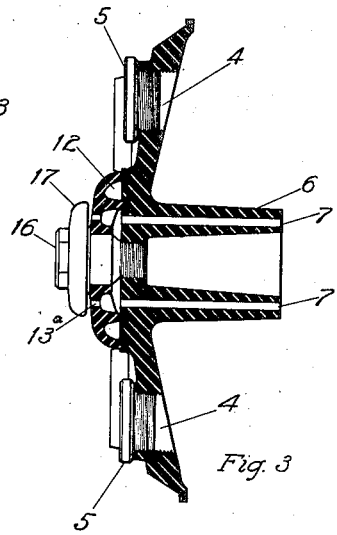
Figs. 2 and 3 represent elevational views in section of the battery cell disclosed in Fig. 1, being taken along vertical and horizontal center lines respectively.

The walls of a battery cell are indicated by the numeral 1. The battery cell is provided with a cover 2 adapted to closely fit the walls 1 and to be sealed to said walls 1 by any preferred means. The cover 2 is illustrated as being provided with a plurality of apertures 3, 3, through which the cell posts from the interior of the cell may extend. It will be understood, of course, that the cell posts should be tightly sealed to the cover at the apertures 3, 3, whereby to prevent the passage of gases or acid between said cell posts and said cover.

The cover 2 is also provided with apertures 4, 4, for the purpose of filling and inspection. Said apertures 4, 4, may be tightly closed by means of plugs 5, 5.

Figure 2:
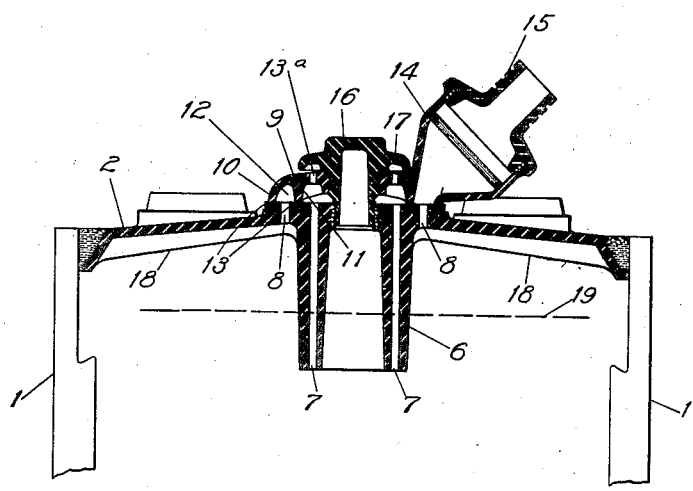

Located substantially centrally of the cover 2 is a downwardly extending collar 6 integral with said cover. Said collar 6 is provided with a plurality of circumferentially placed holes 7, 7, extending longitudinally of said collar. As will be apparent from an inspection of Fig. 2, said holes 7, 7 provide passageways from one side of the cover 2 to the other side thereof. Placed outside of the collar 6 is a series of circumferentially placed holes 8, 8, which also extend through the cover 2 from one side to the other thereof.

Adapted to rest upon the upper side of the cover 2 is an exhaust mechanism 9. Said mechanism 9 is provided with a pair of downwardly extending collars 10 and 11, adapted to straddle the circumferentially placed holes 8, 8. Said collars 10 and 11 form between them an annular passage-way 12. A washer 13 will preferably be provided between the exhaust mechanism 9 and the cover 2 to provide a tight joint therebetween. The exhaust mechanism 9 will be provided with a series of circumferential holes 13$^a$, 13$^a$. Integral with the exhaust mechanism 9 and communicating with the annular pasage-way 12 is a flared portion 14 which has communication with a nozzle 15. Said nozzle 15 may be connected to an exhaust pump or any other preferred exhausting means. A nut 16 is provided, having screw-threaded engagement with the center portion of the cover 2, by means of which the exhaust mechanism 9 will be tightly held against the washer 13 held in a position central of said cover 2. Said nut 16 is provided with an umbrella portion 17 which will shield the apertures 13$^a$, 13$^a$ against the entrance of foreign material, while permitting the access of air thereto.

The cover 2 will preferably be of inverted saucer-like configuration, whereby its highest point will be centrally located. A plurality of strengthening ribs 18, 18, will be provided, all of which radiate from the center portion of the cover 2 to the outer extremities thereof. Preferably the apertures 3 for the cell posts and the apertures 4 for filling and inspection will be located so that their diameters will be in line with certain of the strengthening ribs 18, 18, whereby maximum strength in the cover will be provided for and whereby less resistance will be provided to the gases which will evolve from the electrolyte near the walls of the jar. The holes 8 will preferably be located between the ribs 18.

The downwardly extending collar 6 should extend to a point materially below the normal level of the electrolyte in the cell, which level is indicated by the numeral 19. Due to the central location of the collar 6, said collar will extend below the electrolyte, regardless of how the cell 1 may be tipped in service. It will be practically impossible to so tip the cell 1 that any of the holes 7, 7, will be clear of the electrolyte. In practice, the nozzle 15 will be attached to any convenient exhaust mechanism. The angular position of said nozzle in a plane parallel to the cover may be adjusted by simply loosening the nut 16. It will be obvious that unobstructed radial passage-ways are provided for the gases within the cell to the highest point of the cell where the holes 8, 8, are provided. Said holes 8, 8, communicate with the annular passage-way 12 of the exhaust mechanism through which said gases may be drawn off. Air to replace the exhaust gases will enter the cell under the umbrella portion 17 of the nut 16 through the holes 13 and 7, whence said air will bubble through the electrolyte to the space whence the gases have been exhausted. The sulfuric acid of the electrolyte will collect the moisture from the air whereby to replenish the moisture lost through evaporation.

One embodiment of the present invention has been described in detail. Many modifications will occur to those skilled in the art. It is intended in this patent to cover all such modifications that come within the scope of the invention as defined by the appended claims.

What I claim as new and desire to secure by Letters Patent of the United States is—

1. A battery cell cover having exhaust means placed substantially centrally thereof, said cover being saucer-shaped and having reinforcing ribs on the underside thereof forming passage-ways converging toward said exhaust means.

2. A battery cell cover having exhaust means placed substantially centrally thereof and having reinforcing ribs on the under side thereof forming passage-ways converging toward said exhaust means.

3. A battery cell adapted to contain electrolyte, said cell having a cover provided with a substantially centrally placed collar extending downwardly to a point materially below the normal level of the electrolyte.

4. A battery cell adapted to contain electrolyte, said cell having a cover provided with a substantially centrally placed collar extending downwardly to a point materially below the normal level of the electrolyte, said collar being provided with holes extending longitudinally thereof from one side of said cover to the other.

5. A battery cell adapted to contain electrolyte, said cell having a cover provided with a substantially centrally placed collar extending downwardly to a point materially below the normal level of the electrolyte, said collar being provided with holes extending longitudinally thereof from one side of said cover to the other, said cover being also provided with an exhaust aperture outside of said collar.

6. A battery cell adapted to contain electrolyte, said cell having a cover provided with a downwardly extending member having a hole therethrough extending from one side of said cover to the other, said member extending materially below the normal level of the electrolyte, said cover being provided with a series of exhaust apertures and a revoluble cover permitting communication from the outside air to said hole but shielding said hole, said cover having an exhaust port communicating with said exhaust apertures.

7. A battery cell provided with a cell cover having a port for the inlet of air and an exhaust port, a revoluble cover for shielding said first mentioned port and provided with exhaust means communicating with said exhaust port.

8. A battery cell adapted to contain electrolyte, said cell being provided with a cover having an air inlet port and an outlet port, means for compelling air in passing from one to the other of said ports to pass below the level of the electrolyte, and a common revoluble cover for said ports shielding said ports and providing an exhaust passage from said exhaust port.

In witness whereof, I have hereunto subscribed my name.

FRANK ENGEL.